Dec. 4, 1956 W. B. KLINGER 2,772,918
DUMPING TRACTOR-TRAILER VEHICLE
Filed April 9, 1953
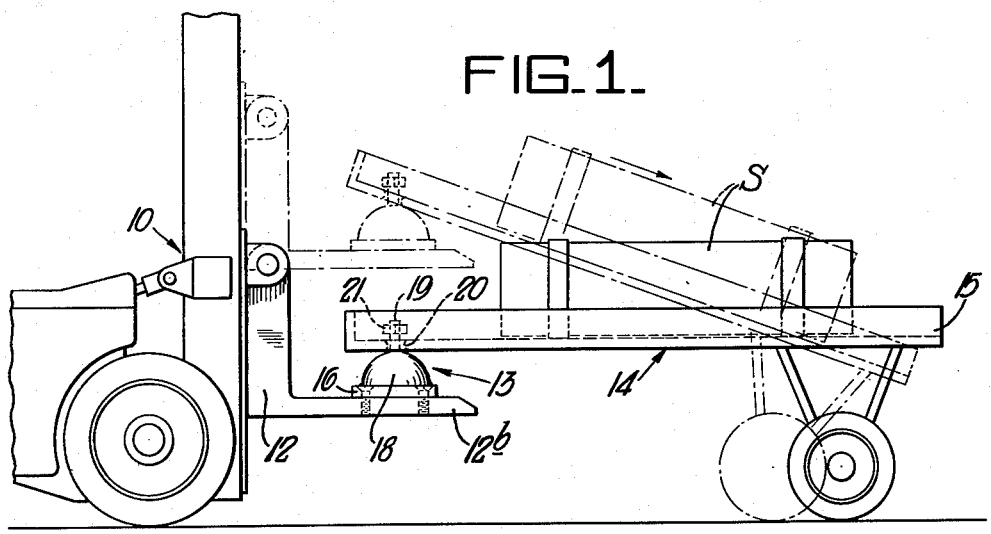
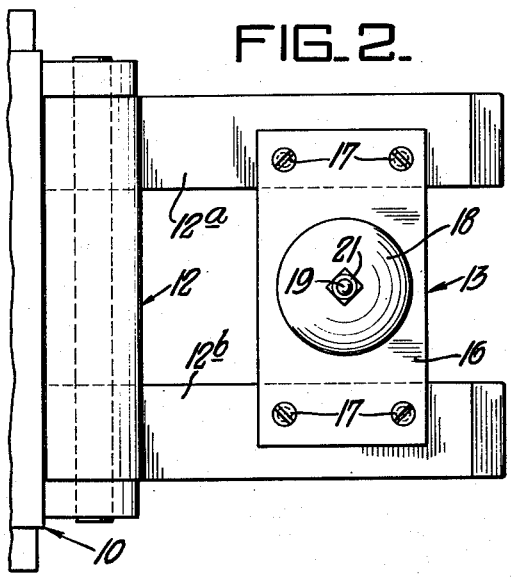
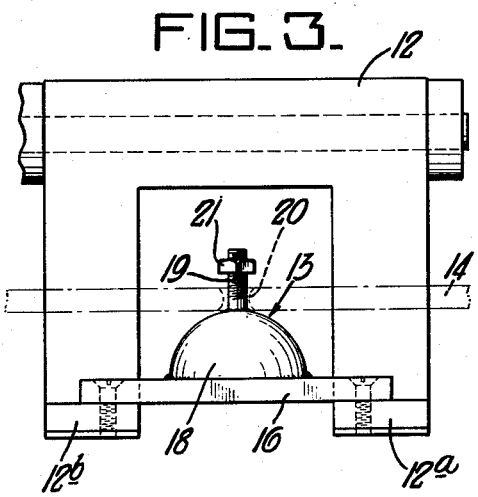
Inventor:
WILLIAM B. KLINGER,
by: Donald G. Dalton
his Attorney.

United States Patent Office 2,772,918
Patented Dec. 4, 1956

2,772,918

DUMPING TRACTOR-TRAILER VEHICLE

William B. Klinger, Niles, Ohio, assignor to United States Steel Corporation, a corporation of New Jersey Application April 9, 1953, Serial No. 347,772

1 Claim. (Cl. 298—5)

This invention relates to a device for attaching trailers to fork trucks.

An object of the invention is to provide an improved attaching device which enables a trailer connected to a fork truck to be unloaded merely by raising the fork.

A more specific object is to provide an improved attaching device which connects a trailer to a fork truck and furnishes a hemispherical bearing for positively supporting one end of the trailer at all times and thus allows the trailer to be unloaded merely by raising the fork.

In accomplishing these and other objects of the invention, I have provided improved details of structure, a preferred form of which is shown in the accompanying drawings, in which:

Figure 1 is a diagrammatic side elevational view of a portion of a fork truck and a trailer connected thereto by an attaching device constructed in accordance with my invention;

Figure 2 is a top plan view on a larger scale of the fork and the attaching device installed thereon; and Figure 3 is an end elevational view of the structure shown in Figure 2.

Figure 1 shows a fork truck 10 of any standard or desired construction which includes a vertically movable fork 12 at its front end. The fork has horizontally extending spaced apart tines 12a and 12b which in the usual operation of the truck carry a load directly. However, in the present instance these tines carry an attaching device 13 which is constructed in accordance with the present invention and is described in detail hereinafter. The back end of a two-wheel trailer 14 is connected to the attaching device so that the truck can push the trailer to transport a load S. The front end of the trailer is open as indicated at 15 so that the trailer can be unloaded gravitationally by lifting its back end.

The attaching device 13 comprises a horizontal base plate 16 which bridges the space between the tines 12a and 12b and is removably fastened to the tines as by bolts or screws 17. The upper face of the base plate carries a hemispherical bearing 18 midway of its length. A screw-threaded stud 19 is fixed to said bearing and extends upwardly therefrom with its axis vertical. The back end of the trailer 14 contains an opening 20 of somewhat larger diameter than the stud, which passes loosely therethrough. The upper end of the stud carries a nut 21.

In operation, the fork 12 is adjusted to a height where the floor of the trailer 14 is approximately level, as shown in full lines in Figure 1, so that the trailer can support the load S, such as a bundle of steel sheets. The truck can push the load to any desired location, such as into a railway boxcar. The hemispherical bearing 18 furnishes a positive support for the back end of the trailer and the connection with the stud 18 assures that the trailer remains attached to the truck. When the trailer is to be unloaded, it is merely necessary to raise the fork 12 and thus lift the back end of the trailer so that the load S can slide gravitationally off the front end, as shown in dot-dash lines in Figure 1. All the while the hemispherical bearing continues to afford a positive support for the back end. The connection with the stud is sufficiently loose that it does not interfere with such movement.

From the foregoing description it is seen that the present invention affords a simple and especially practical attaching device. It can be used on standard fork trucks and the only structural change needed is to drill and tap openings in the tines for the bolts 17. When the attaching device is not needed, it can be removed readily.

While I have shown and described only a single embodiment of the invention, it is apparent that modifications may arise. Therefore I do not wish to be limited to the disclosure set forth but only by the scope of the appended claim.

I claim:

In combination, a truck which includes a vertically movable fork at its front end, said fork having a pair of horizontally spaced apart tines, a trailer which includes a floor and a pair of wheels adjacent the front end of said floor, the front end of said floor being unobstructed to permit a load to be dumped therefrom when the back end is lifted, and a device attaching said trailer to said truck, said device comprising a base plate bridging the space between said tines and being removably fastened to said tines, a hemispherical bearing affixed to the top of said base plate and having an upwardly curved spherical surface, a screw threaded vertically extending stud upstanding from the spherical surface of said bearing, said floor having an opening adjacent its back end loosely receiving said stud, and a fastener screw-threadedly engaged with said stud above said floor, the underside of said floor resting on the spherical surface of said bearing irrespective of the vertical position of said fork or the inclination of said floor to provide a positive support for the back end of the floor and for lifting it for dumping.

References Cited in the file of this patent

UNITED STATES PATENTS

| 2,120,042 | Remde | June 7, 1938 |
| 2,410,373 | Westervelt | Oct. 29, 1946 |
| 2,564,520 | Blasdell | Aug. 14, 1951 |

FOREIGN PATENTS

| 584,595 | France | Nov. 22, 1924 |